(No Model.)  J. C. RICHARDSON.  5 Sheets—Sheet 1.
NAIL MAKING MACHINE.

No. 602,566.  Patented Apr. 19, 1898.

WITNESSES:
Ernest Pulford
Henry L. Deck

INVENTOR
Julius C. Richardson,
By Wilhelm Bonner
Attorneys.

(No Model.)　　　　J. C. RICHARDSON.　　5 Sheets—Sheet 5.
NAIL MAKING MACHINE.

No. 602,566.　　　　　　　　　Patented Apr. 19, 1898.

Witnesses.　　　　　J. C. Richardson, Inventor.
　　　　　　　　　　By Wilhelm Bonner, Attorneys.

THE NORRIS PETERS CO., PHOTO-LITHO., WASHINGTON, D. C.

UNITED STATES PATENT OFFICE.

JULIUS C. RICHARDSON, OF BUFFALO, NEW YORK, ASSIGNOR OF TWO-THIRDS TO ERNEST WENDE AND LUCAS H. VAN ALLEN, OF SAME PLACE.

NAIL-MAKING MACHINE.

SPECIFICATION forming part of Letters Patent No. 602,566, dated April 19, 1898.

Application filed July 6, 1897. Serial No. 643,520. (No model.)

*To all whom it may concern:*

Be it known that I, JULIUS C. RICHARDSON, a citizen of the United States, residing at Buffalo, in the county of Erie and State of New York, have invented new and useful Improvements in Nail-Making Machines, of which the following is a specification.

This invention relates to that class of nail-making machines in which the blanks are cut from a coil of wire and upset at one end to form the head of the nail.

The object of this invention is to produce a machine of this type which will expeditiously form screw-nails, each of which has a slotted head at one end, a taper or point at its opposite end, a straight body portion adjacent to the head, and a twisted or spiral portion adjacent to the pointed end.

In the accompanying drawings, consisting of five sheets.

Like letters of reference refer to like parts in the several figures.

Figures 15, 16, 17, 18, 19, 20, 21, 22, 23, 24:
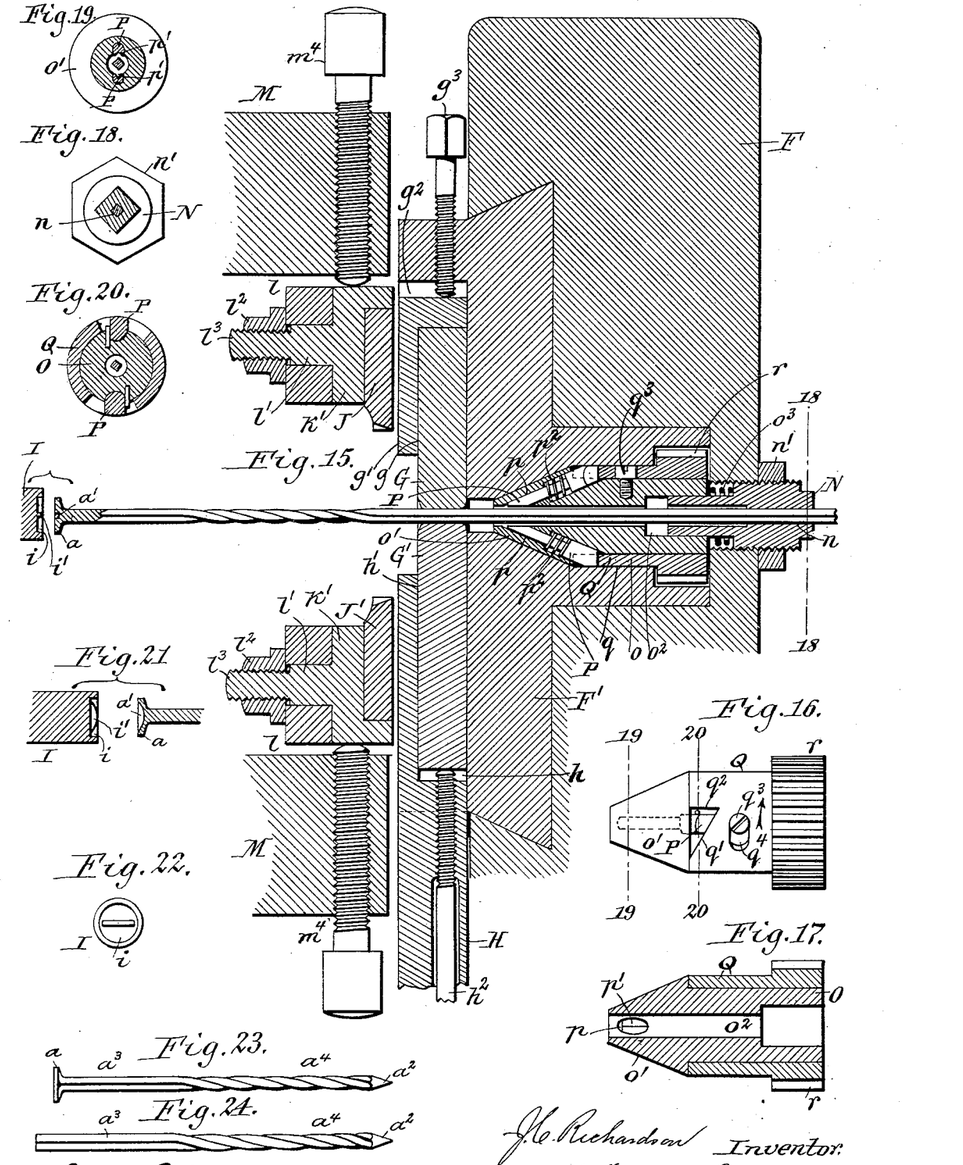
Fig. 15 is a fragmentary horizontal section, on an enlarged scale, of the clamping, cutting, and twisting mechanism.
Fig. 16 is a detached side elevation of the twisting-chuck.
Fig. 17 is a detached longitudinal section of the twisting-chuck at right angles to Fig. 15.
Fig. 18 is a transverse section in line 18 18, Fig. 15.
Figs. 19 and 20 are transverse sections in lines 19 19 and 20 20, Fig. 16, respectively.
Fig. 21 is a fragmentary longitudinal section of the heading-hammer and the headed end of a nail formed thereby at right angles to Fig. 15.
Fig. 22 is an end view of the hammer.
Fig. 23 is a side view of a headed screw-nail which may be produced by this machine.
Fig. 24 is a similar view of a headless screw-nail which may be produced by this machine.

The wire from which the nails are made is preferably square in cross-section, as shown in the drawings; but other forms of wire can also be used. One form of nail which may be produced by this machine consists of a body provided at one end with a head $a$, having a transverse groove or nick $a'$ in its outer or front side for the reception of a screwdriver, a taper or point $a^2$ at its opposite end, a straight portion $a^3$, extending inwardly from the head about one-third of the length of the body, and a screw or twisted portion $a^4$, extending about two-thirds of the length of the body from the straight portion $a^3$ to the pointed end $a^2$ of the same, as shown in Fig. 23.

The main frame of the machine consists, essentially, of a horizontal bed B, which is supported by legs $b$.

C represents the wire-straightening rollers, which are mounted on the front portion of the bed and to which the wire stock is fed from a reel or otherwise by an intermittent feeding mechanism, which is preferably constructed as follows:

$c$ is a longitudinal reciprocating carriage mounted on the front portion of the bed and provided with an abutment or jaw $c'$ and a spring feed-pawl $c^2$, between which the wire passes. During the forward movement of the carriage this feed-pawl grasps the wire and feeds the same forward one length, and during the backward movement of the carriage the feed-pawl clears itself from the wire and moves back independent of the same. The reciprocating movement is imparted to the feed-pawl carriage by a connecting-rod $d$, which is connected at one end with said carriage and with its other end to a crank-wheel $d'$. The latter is mounted on one end of a main shaft D, which is journaled transversely on the rear portion of the bed. In order to permit of varying the length of the nail, the extent of the reciprocating movement of the feed-pawl is regulated by means of a block $d^2$, to which the rear end of the connecting-rod $d$ is pivoted and which is moved inwardly or outwardly in a radial slot $d^3$ in the crank-wheel $d'$ by means of an adjusting-screw $d^4$. The wire is prevented from moving backwardly with the feed-pawl by a detent-pawl $e$, which is arranged on the bed in rear of the straightening-rollers and which presses the wire against a stationary abutment or jaw $e'$ on the bed.

The wire passes from the feeding mechanism through a longitudinal opening or passage formed in an anvil, which consists, preferably, of a stationary front section F, formed integrally with the bed, and a detachable rear section F', connected with the stationary section.

Figures 10, 11, 12, 13, 14:
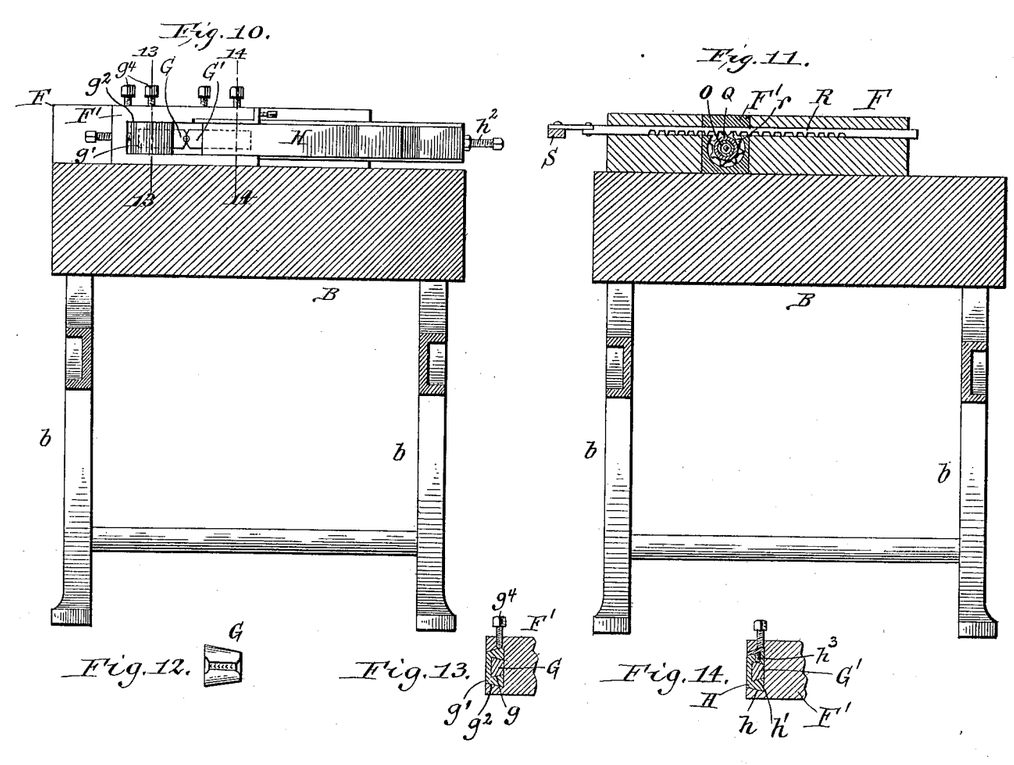
Figs. 10 and 11 are vertical cross-sections of the machine in line 10 10 and 11 11, Fig. 1.
Fig. 12 is an end view of one of the clamping-dies.
Figs. 13 and 14 are fragmentary vertical sections in lines 13 13 and 14 14, Fig. 10, respectively.

G G' represent two clamping or gripping jaws, whereby the wire is held during the operation of forming the head of the nail and cutting the finished nail from the wire stock and which have their gripping-faces made to conform to the shape of the wire stock and to the shape it is desired to give the back of the nail-head. These clamping-jaws are arranged transversely in rear of the anvil and on opposite sides of the path of the wire stock, and one of said jaws is preferably stationary while in operation and the other is movable toward and from the stationary jaw for holding and releasing the wire stock. The outer portion of the stationary jaw G is secured in a socket $g$, formed in an adjustable carrier or slide $g'$, which latter is guided in a transverse way $g^2$ on the rear side of the rear anvil-section, as represented in Figs. 10, 13, and 15. This carrier is shifted for adjusting the face of its clamping-jaw horizontally to the wire stock by means of a horizontal adjusting-screw $g^3$, arranged in the outer portion of the rear anvil-section and bearing against the outer end of the stationary clamping-jaw carrier, and the latter, together with its clamping-jaws, is held in its adjusted position by means of set-screws $g^4$, arranged in the rear anvil-section and bearing against the carrier.

H represents a transversely-reciprocating carrier or slide which is guided in a way $h$ on the rear side of the rear anvil-section, and which is provided on its inner end with a socket $h'$, in which the movable clamping-jaw G' is adjustably mounted. The adjustment of the movable clamping-jaw on the reciprocating carrier is effected by a horizontal adjusting-screw $h^2$, arranged in the carrier and bearing against the outer end of the movable clamping-jaw, and the latter is held in its adjusted position by set-screws $h^3$, arranged in the carrier and bearing against the movable clamping-jaw, as represented in Fig. 14.

Figures 1, 2, 3:
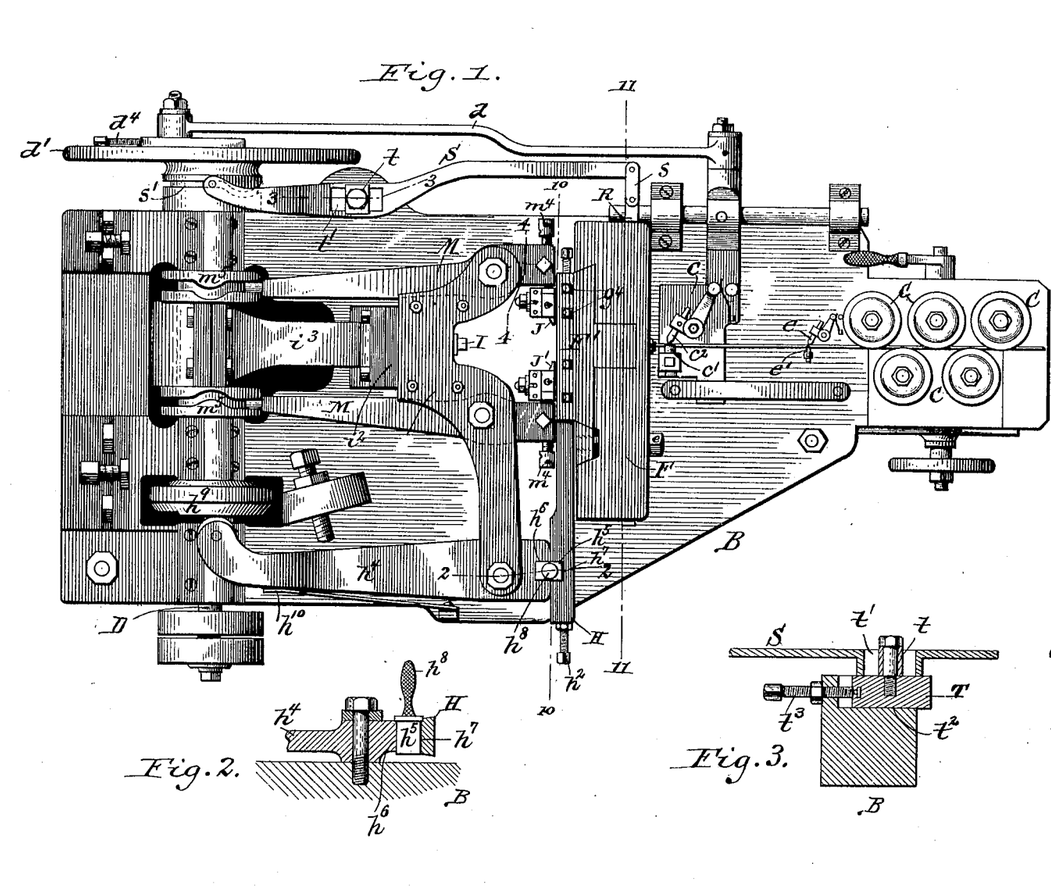
Figure 1 is a top plan view of a nail-making machine embodying my improvements.
Figs. 2 and 3 are fragmentary longitudinal sections in lines 2 2 and 3 3, Fig. 1, respectively.

$h^4$ is a rock-lever whereby the reciprocating carrier is actuated and which is pivoted on the upper side of the left-hand portion of the bed. The front arm of the rock-lever is arranged adjacent to the rear side of the reciprocating carrier H and is loosely connected with the same by a key or coupling-block $h^5$, which fits with one end into a notch or recess $h^6$ in the front arm of the rock-lever and with its opposite end into a notch or recess $h^7$, formed in the rear side of the reciprocating carrier, as represented in Figs. 1 and 2. This coupling-key transmits the movement of the rocking lever to the movable clamp-carrier and is provided with a handle $h^8$, whereby the coupling-key can be readily inserted and removed from the recesses in the rock-lever and clamp-carrier for connecting and disconnecting these parts. This means of coupling the rocking lever and carrying-slide permits the latter to be withdrawn from the machine for repairing its jaw and to be restored without disturbing the rock-lever. The forward or inward movement of the movable clamp-jaw for grasping the wire is produced by a cam $h^9$, mounted on the main shaft D and engaging with a roller on the rear arm of the rock-lever $h^4$, and the outward or backward movement of this jaw is produced by a spring $h^{10}$, connected with its ends to the rear arm of the rock-lever and the bed.

I represents the heading-punch or hammer whereby the nail-head is formed on the front end of the wire and which is arranged lengthwise in rear of the clamping-jaws and in line with the path of the wire. This hammer has its face provided with a cavity $i$, which has the shape it is desired to give the head of the nail, and with a transverse rib $i'$ in said cavity, which forms the slot or nick in the head of the nail. This hammer is mounted on a longitudinally-reciprocating carriage $i^2$, which is guided in ways arranged on the central portion of the bed. The hammer is actuated from the main shaft by a connecting rod or bar $i^3$, which connects the hammer-carriage with a crank or eccentric on the central portion of the main shaft in a well-known manner.

The mechanism whereby the nail is pointed and cut off from the wire stock is constructed as follows:

J J', Figs. 1, 4, 5, 6, 9, and 15, represent two transversely-movable cutting-dies which are arranged on opposite sides of the path of the wire in rear of the clamping-jaws and each of which is provided with a vertical or transverse cutting edge $j$, which is adapted to coöperate with the same edge of the other die for cutting off the nail squarely from the wire stock, a V-shaped cutting edge $j'$ extending laterally from the transverse cutting edge and adapted to coöperate with the same edge of the other die for pointing the end of the nail, and two abutment-faces $j^2$, arranged on opposite sides of the transverse edge and adapted to engage with the same faces of the other die for preventing the cutting edges from being injured. The space between the V-shaped cutting edges of each cutter is preferably concaved conically, whereby the two cutters together form a conical point on the end of the nail while cutting the same from the wire stock. These cutting-dies are moved intermittently toward and from each other, and each die is provided at its outer end with a shank of dovetail form, which fits with its lower side into a correspondingly-shaped recess $k$, formed on the front side of a transversely-oscillating die or knife block $k'$.

$k^2$ is a cutter-clamping plate provided at its rear end with a hook $k^3$, which engages with a groove $k^4$ in the upper side of the die-block and is pressed with its front end against the upper beveled side of the cutter by a bolt $k^5$, which connects the clamping-plate with the die-block.

L L' represent two upright rock-levers which move transversely and upon the upper slotted or bifurcated arms $l$ of which the die-blocks are mounted. Each die-block is provided on its rear side with a contracted portion $l'$, projecting through the slot in one of said levers, and forms a shoulder bearing against the front side of the respective lever. The die-block is held on said arm by a screw-nut $l^2$, engaging with a screw-threaded stem $l^3$ on the die-block and bearing against the rear side of the bifurcated arm.

Figures 4, 5, 6, 7:
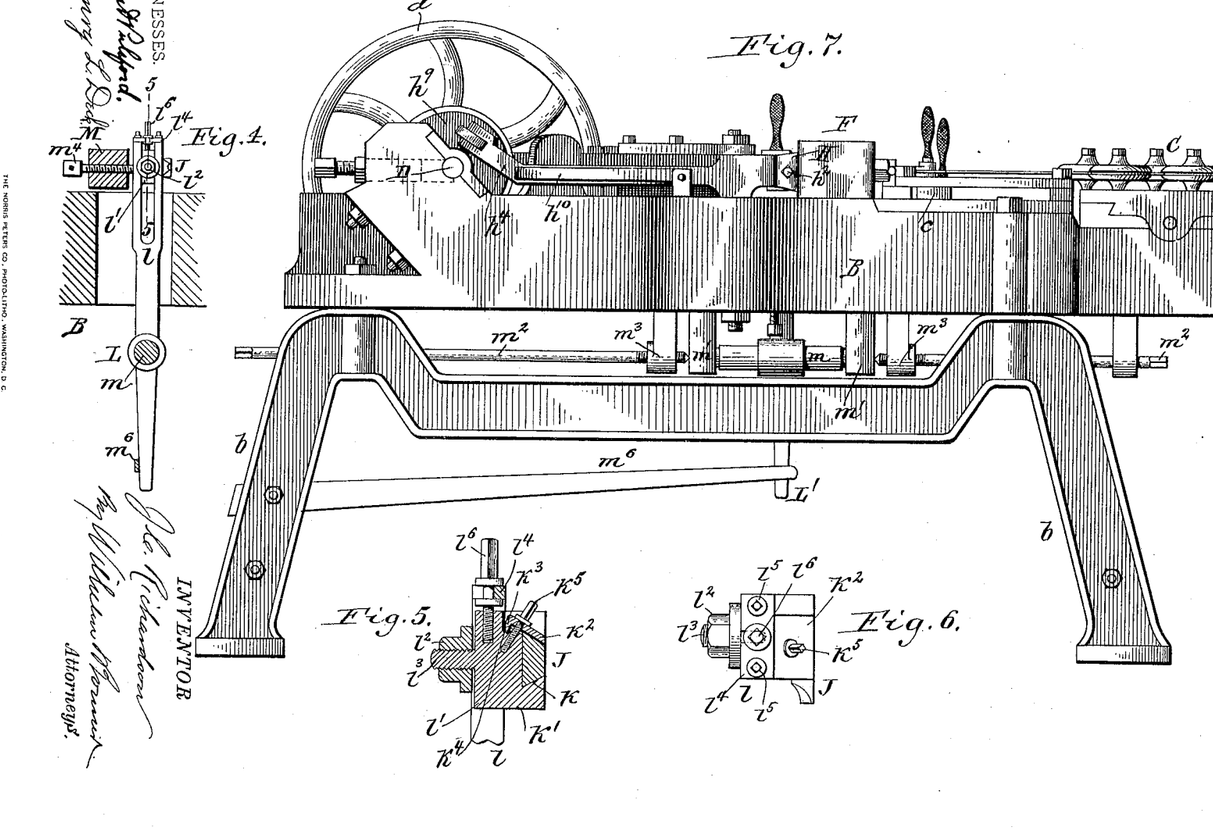
Fig. 4 is a fragmentary transverse section in line 4 4, Fig. 1, of one of the cutter-supporting levers and adjacent parts, showing the cutter in its innermost or operative position.
Fig. 5 is a vertical section, on an enlarged scale, in line 5 5, Fig. 4.
Fig. 6 is a top plan view, on an enlarged scale, of one of the cutters and its support.
Figs. 7 and 8 are side elevations of the machine viewed from opposite sides.
Figures 8, 9:
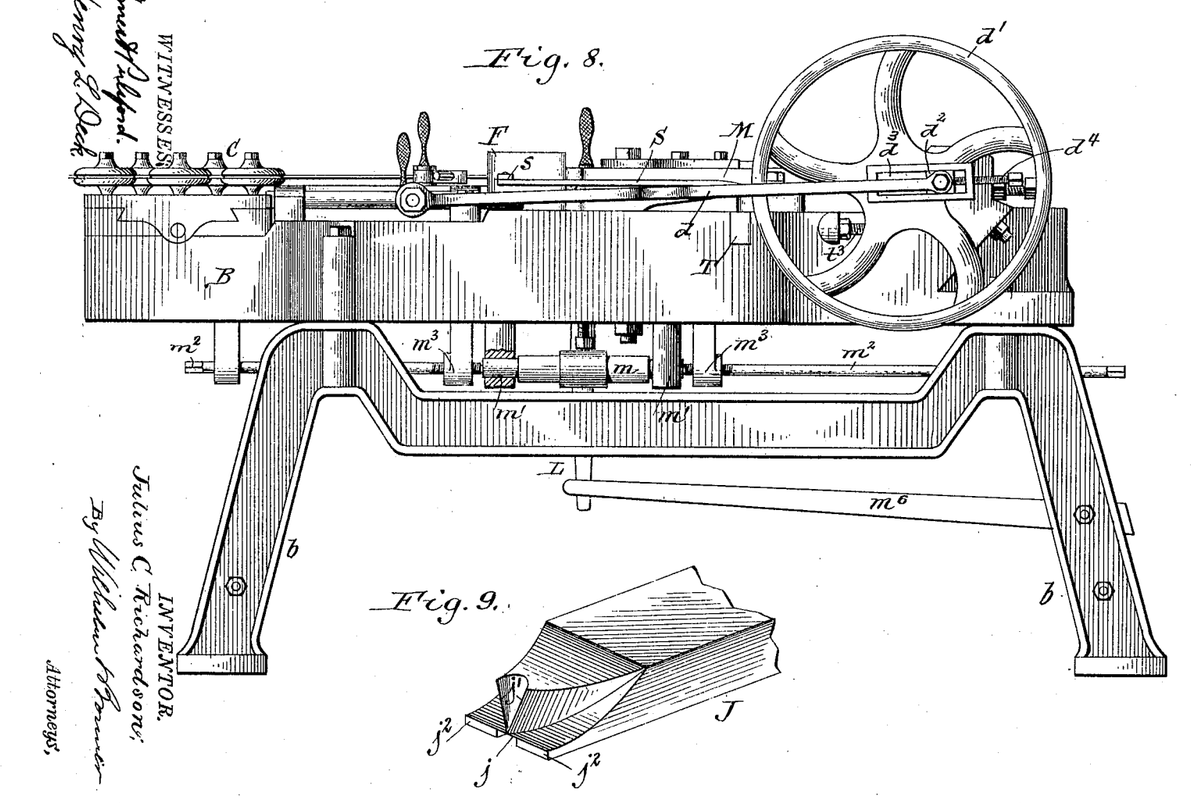
Fig. 9 is a fragmentary perspective view of one of the cutters.

$l^4$ is a transverse plate which is secured with its ends by bolts $l^5$ to the upper ends of the members of the bifurcated arm, and $l^6$ is a vertical adjusting-screw which engages with a screw-threaded opening in the upper side of the die-block and is mounted in said transverse plate $l^4$, so as to be capable of turning therein, but held against longitudinal movement thereon. The fastening and adjusting bolts $l^5$ $l^6$ and the connecting-plate $l^4$ must of necessity be arranged very close to the cutter-clamping plate $k^2$ and its clamping-bolt $k^5$, and in order to obtain sufficient room between these parts to permit of conveniently manipulating the bolts of one plate without interfering with the adjacent parts the bolt of the clamping-plate is arranged a an angle, as shown in Figs. 5 and 6, whereby sufficient clearance is produced to avoid this difficulty.

Each of the vertical rock-levers is mounted on a horizontal rock-shaft $m$, which is journaled lengthwise in bearings $m'$ on the under side of the bed and which is capable of being shifted in these bearings for adjusting the cutters lengthwise in the machine. This adjustment is preferably effected by means of adjusting-screws $m^2$, engaging with screw-threaded hangers $m^3$ on the bed and bearing against the ends of the rock-shaft. Each vertical rock-lever is turned for carrying its cutter toward the wire by a horizontal rock-lever M, pivoted lengthwise on the bed and provided on its front arm with an adjusting-screw $m^4$, which bears against the outer side of one of the die-blocks and engages its rear arm with a cam $m^5$, which is mounted on the main shaft. The return movement of each cutter away from the wire is effected by a spring $m^6$, secured with one end to one of the legs of the frame and bearing with its other end against the lower arm of the respective vertical rock-lever.

The mechanism whereby the twist is formed in the wire stock for producing a screw-nail is constructed as follows:

N represents an externally-screw-threaded wire-holding bushing or sleeve through which the wire passes after it leaves the feeding mechanism and which is screwed into the front portion of the opening in the front anvil-section, which opening is internally threaded for this purpose. A portion of the bore of the bushing is made of the same shape as the cross-section of the wire, being square in this instance, as shown at $n$ in Fig. 18, and forming a holding-seat into which the wire fits snugly, and whereby the body of the wire in the square holding-seat and all that portion in front of the seat is prevented from turning. The location of the holding-seat may be varied lengthwise by screwing the bushing backward or forward in the anvil, and the bushing is held firmly in its adjusted position by a jam-nut $n'$, arranged on the bushing and bearing against the front side of the front anvil-section. From the wire-holding bushing the wire passes through a rotary chuck which is arranged in the opening of the rear anvil-section between the wire-holding jaws and the holding-bushing and axially in line with the latter. The body of this chuck is provided with a cylindrical front portion O, a conical rear portion $o'$, which bears against a correspondingly-shaped shoulder in the opening of the rear anvil-section, and a passage or opening $o^2$, extending axially through the body. The front portion of the central passage in the chuck-body is enlarged and receives the contracted rear portion of the holding-bushing, and the chuck-body is constantly pressed rearward, with its conical portion against the conical shoulder of the rear anvil-section, by a spring $o^3$, surrounding the contracted rear portion of the bushing and bearing with one end against a shoulder on the bushing and with its other end against the front end of the body, thereby serving to center the chuck-body in the rear anvil-section.

P P represent two movable gripping-jaws which are mounted on the chuck-body and which are capable of moving toward and from the wire in the body for clamping the wire in the chuck or releasing the same therefrom. These jaws are arranged obliquely on opposite sides of the body and are guided in oblique openings or ways $p$, which extend from the outer side of the cylindrical portion of the chuck-body rearwardly and inwardly to the central passage in the same, as shown in Fig. 15. The inner ends of these jaws are provided with V-shaped gripping-faces $p'$, which engage with the opposite corners of the square wire when the jaws are projected. Each of the chuck-jaws is yieldingly held in a retracted position by a spring $p^2$, surrounding the jaw and bearing with its ends against shoulders formed, respectively, on the chuck-body and the jaw.

Q is an oscillating cam-sleeve whereby the chuck-jaws are projected into engagement with the wire in the chuck-body and which turns with its inner side on the cylindrical portion of the body and with its outer side in a cylindrical bearing $q$, formed in the adjacent portion of the rear anvil-section. This cam-sleeve is provided on diametrically opposite sides with notches or recesses into which the outer ends of the chuck-jaws project, and each of these recesses is provided with an inclined front side or cam-face $q'$, which engages with the beveled or inclined outer end of one of the jaws and with an abrupt rear side $q^2$, as represented in Fig. 16.

$q^3$ is a screw or projection arranged on the outer side of the cylindrical portion of the body and engaging with a circumferential slot $q^4$ in the cam-sleeve, whereby the latter is held against displacement and its rotary movement on the chuck-body is limited.

Upon turning the cam-sleeve forwardly in the direction of the arrow, Fig. 16, when the body stands still and the parts are in the position shown in Figs. 15, 16, and 19, the cam-sleeve during the first portion of this movement projects the jaws into engagement with the wire stock by means of its inclines $q'$. When the jaws have grasped the wire, their forward movement is arrested and the cam-sleeve can no longer turn on the body; but the latter is compelled to turn with the cam-sleeve to the end of the forward rotary movement of the cam-sleeve, whereby the jaws are turned about the axis of the chuck, and the wire held therein is also turned, thereby twisting a screw or spiral thread upon the same between the chuck-jaws and the holding-seat of the bushing. The clamping-jaws, the cutters, and the hammer are disengaged from the advancing end of the wire stock, so that this portion of the wire is free to turn during the forward rotary movement of the chuck, thereby permitting that portion of the wire between the chuck and the clamping-jaws to turn freely with the chuck and preserving this portion of the wire perfectly straight. The length of the slot $q^4$ is such that when the cam-sleeve has been turned so as to project the chuck-jaws into engagement with the wire stock the rear end of this slot does not bear against the screw, thereby enabling the full pressure of the cam-sleeve to be brought on the chuck-jaws. During the first portion of the backward rotary movement of the cam-sleeve the latter turns independent of the body, whereby the springs $p^2$ are permitted to retract the chuck-jaws out of engagement with the wire stock, after which the front end of the slot $q^4$ in the sleeve strikes the stop $q^3$ and compels the chuck-body to turn backwardly with the cam-sleeve to the end of its backward movement, thereby avoiding untwisting of the wire.

The oscillating movement of the chuck and the opening and closing of its jaws is produced by a reciprocating gear-rack R, which meshes with a gear-rim $r$, formed on the front portion of the cam-sleeve. This gear-rim is arranged in an enlargement of the front portion of the opening in the rear anvil-section, and the gear-rack is guided in a transverse way formed in the front and rear anvil-sections, as shown in Fig. 11. The gear-rack is actuated by a rock-lever S, connected at its front end by a link $s$ with the outer end of the gear-rack and provided at its rear end with a pin engaging in the cam-groove of a cam $s'$, which is mounted on the main shaft and whereby the rock-lever is oscillated. The rock-lever S is pivoted between its arms to the upper side of the right-hand portion of the bed, and in order to permit of varying the amount of twist which is put on the nail this pivot is made adjustable, so as to vary the throw of the lever and the turning movement of the chuck. This adjustment may be effected in a variety of ways—for instance, as shown in the drawings, by means of a movable block $t$, arranged in a longitudinal slot $t'$ in the rock-lever S and pivoted to a slide T, which can be adjusted in a longitudinal way $t^2$ on the bed by an adjusting-screw $t^3$, as shown in Figs. 1 and 3.

The operation, briefly, of my improved nail-making machine for producing a headed screw-nail is as follows: Before starting the machine the wire is fed by hand between the straightening-rollers, past feeding and detent pawls, through the holding-bushing, twisting-chuck, and between the clamping-jaws and cutters until the front end of the wire projects a short distance in rear of the cutters. Upon starting the machine the clamping-jaws close upon the wire and hold the same firmly, after which the cutters come together and then separate, whereby the surplus stock is cut off squarely from the front end of the wire, and a sufficient portion of wire is left between the cutters and the holding-jaws to form the head of a nail. While the clamping-jaws are still holding the wire the hammer moves forwardly against that portion of the wire which projects in rear of the clamping-jaws and upsets or spreads the same against the rear side of the latter and then recedes, thereby forming a head on the advancing end of the wire. At the same time that the head of the nail is formed on the wire stock the transverse rib $i'$ of the hammer forms the screw-driver nick or slit $a'$ in the nail-head. The clamping-jaws now separate and release the wire and the rotary chuck grasps the wire at a point about one-third of the distance between the front side of the clamping-jaws and the holding-seat of the bushing and twists the wire between the chuck and the holding-seat, which latter during this time prevents the wire stock in rear of the bushing from turning. After the chuck has twisted the wire and released itself from the wire during its return movement the wire-feeding mechanism feeds the wire forward until the rear end of the twisted portion of the wire stands in front of the cutting-dies. The clamping-jaws now close upon the wire, after which the cutters engage with opposite sides of the wire and cut the nail squarely off from the wire stock and at the same time form a point on the nail. After the nail has been thus completed the hammer again comes forward and heads the wire for the next nail, this operation, together with the twisting and cutting operations, being continually repeated, as before described, for producing each nail.

The amount of metal which is left standing in rear of the clamping-jaws can be varied for varying the size of the nail-head by adjusting the cutters toward or from the clamping-jaws. By shifting the bushing lengthwise in the anvil the extent of the twist or spiral on the nail can be regulated, and by adjusting the connection between the rod $d$ and the wheel $d'$ toward and from the center of the main shaft the length of the nail can be adjusted.

When it is desired to produce a headless screw-nail, the hammer is thrown out of gear by disconnecting its rod $i^3$ from the actuating eccentric or crank on the main shaft or by removing the hammer from its carriage.

If it is desired to dispense with the nick or groove in the head of the nail, the transverse rib on the face of the heading-hammer is omitted.

I claim as my invention—

1. The combination with a rotary chuck adapted to intermittently grasp the wire, of a wire-holding device arranged in front of the chuck and serving to hold the wire stock against turning, whereby the wire is twisted between the chuck and the holding device, substantially as set forth.

2. The combination with the wire-cutter, of an intermittently-rotating chuck arranged in front of the wire-cutter and provided with wire-holding jaws which move toward and from the wire for grasping or releasing the wire, and a holding device arranged in front of the chuck and serving to hold the wire stock against turning, substantially as set forth.

3. The combination with the wire heading and cutting devices, of a rotary chuck which is arranged in front of said heading and cutting devices and which intermittently grasps the wire and twists the same, and a bushing arranged in rear of the chuck and provided with a flat-sided seat or opening through which the wire passes and whereby the wire is held against turning, substantially as set forth.

4. The combination with the wire heading and cutting devices, of a rotary chuck-body which is arranged in front of the heading and cutting devices and through which the wire passes, gripping-jaws guided on said body and adapted to move toward and from the wire, a rotary cam-sleeve mounted on said body and provided with inclines engaging with said jaws, and a wire-holding device arranged in front of the chuck-body and cam-sleeve, substantially as set forth.

5. The combination with the wire heading and cutting devices, of a rotary chuck-body which is arranged in front of the heading and cutting devices and through which the wire passes, gripping-jaws guided on said body and adapted to move toward and from the wire, a rotary cam-sleeve mounted on said body and provided with inclines engaging with said jaws for projecting said jaws into an operative position, springs interposed between said jaws and the chuck-body and adapted to retract the jaws into an inoperative position, and a wire-holding device arranged in front of the chuck-body and cam-sleeve, substantially as set forth.

6. The combination with the wire heading and cutting devices, of a rotary chuck-body which is arranged in front of the heading and cutting devices and through which the wire passes, gripping-jaws guided on said body and adapted to move toward and from the wire, a rotary cam-sleeve mounted on said body and provided with inclines engaging with said jaws for projecting said jaws into an operative position, springs interposed between said jaws and the chuck-body and adapted to retract the jaws into an inoperative position, a stop or projection arranged on the chuck-body and engaging with a circumferential slot in the cam-sleeve, and a wire-holding device arranged in front of the chuck-body and cam-sleeve, substantially as set forth.

7. The combination with the wire heading and cutting devices, of a rotary chuck-body which is arranged in front of the heading and cutting devices and through which the wire passes, gripping-jaws guided on said body and adapted to move toward and from the wire, a rotary cam-sleeve mounted on said body and provided with inclines engaging with said jaws, a gear-rim arranged on the cam-sleeve and a reciprocating gear-rack engaging with said gear-rim, substantially as set forth.

8. The combination with the cutting device, of a wire-twisting device, a rock-lever whereby said twisting device is actuated and which is provided with a longitudinal slot, a pivot for the rock-lever arranged in the slot thereof, and an adjustable support carrying said pivot, substantially as set forth.

9. The combination with the wire-cutter, of an intermittently-rotating chuck arranged in front of the wire-cutter and provided with wire-holding jaws for grasping or releasing the wire, and a holding device arranged in front of the chuck and capable of longitudinal adjustment in the anvil, substantially as set forth.

10. The combination with the wire heading and cutting devices, of a wire-clamping device composed of two jaws one of which is movable toward and from the other jaw, a slide carrying the movable clamping-jaw and provided with a notch or recess, a rock-lever provided in one of its arms with a notch or recess arranged adjacent to the notch or recess in the slide, and a coupling key or block arranged in the notches or recesses of the rock-arm and slide, substantially as set forth.

Witness my hand this 15th day of December, 1896.

JULIUS C. RICHARDSON.

Witnesses:
CARL F. GEYER,
THEO. L. POPP.